July 29, 1969 L. W. POLLOCK 3,458,602
PROCESS FOR PREPARING POLYMERIC BLENDS
Filed Dec. 31, 1962 4 Sheets-Sheet 1

INVENTOR.
L. W. POLLOCK
BY Young & Quigg
ATTORNEYS

United States Patent Office 3,458,602
Patented July 29, 1969

3,458,602
PROCESS FOR PREPARING POLYMERIC BLENDS
Lyle W. Pollock, Bartlesville, Okla., assignor to Phillips Petroleum Company, a corporation of Delaware
Filed Dec. 31, 1962, Ser. No. 248,766
Int. Cl. C08d 9/02
U.S. Cl. 260—880                                          2 Claims

ABSTRACT OF THE DISCLOSURE

Various techniques are disclosed for preparing blends of polymers from ethylenically unsaturated compounds. Thus, a blend of a polymer prepared by solution polymerization and a polymer prepared by emulsion polymerization is produced by preparing one of the polymers and adding it to the feed to a reaction zone in which the other polymer is made. Where the emulsion polymer is to be added to the solution polymerization zone, the latex is treated with a solvent to extract the polymer and the resulting solution is fed to the solution polymerization zone along with the monomer to be polymerized there.

---

This invention relates to producing a blend of two or more polymer compositions. In one aspect the invention relates to a process for blending a solution polymer and an emulsion polymer. In another aspect the invention relates to a process for the production of a blended polymer composition. In another aspect the invention relates to polymer blends.

To utilize the many varieties of polymers most effectively, in many instances it is desirable to produce polymer blends. Such blends make it possible to take advantage of desirable qualities of the various polymers blended. For example, high cis-content polybutadiene is blended with SBR for use in automobile tires to improve wear, prevent groove cracking and retard ozone attack of tire treads, improve carcass durability and lower operating temperature.

An object of my invention is to blend polymer compositions.

Another object of my invention is to blend a solution polymer and an emulsion polymer economically and efficiently.

Another object of my invention is to produce a blended polymer composition.

Another object of my invention is to blend solution-polymerized butadiene with emulsion-polymerized SBR.

Other aspects, objects and the advantages of my invention are apparent in the written description, the drawing and the claims.

According to my invention a blend of a solution-polymerized polymer and an emulsion-polymerized polymer is produced by the steps of producing one of the polymers and adding it to the feed to a reaction zone in which the other polymer is made.

Where the emulsion-polymerized polymer is to be added to the solution polymerization reaction zone, the latex resulting from the emulsion polymerization is contacted with a water immiscible solvent to remove the polymer, and the resulting polymer solution is fed to the solution polymerization zone along with the monomer to be polymerized there.

The solution-polymerized polymer, on the other hand, can be added to the emulsion polymerization reaction zone. When this is done, to avoid the necessity for emulsifying unnecessarily large amounts of hydrocarbon, I prefer to use as a solvent in the solvent polymerization reaction zone a monomer which is to be polymerized in the emulsion polymerization zone. This process is utilized very effectively in those instances wherein the monomer polymerized in the solution polymerization zone also is a monomer to be polymerized in the emulsion polymerization zone, in which instance a partial polymerization of this monomer in a liquid phase is carried out in the solution zone, the resulting solution of polymer in the monomer being fed into the emulsion polymerization zone. For example, my invention is applicable to a solution polymerization of butadiene followed by an emulsion polymerization of butadiene and styrene to form SBR. In this instance a partial polymerization of butadiene in liquid phase is carried out in the solution polymerization zone, and the solution of polybutadiene in butadiene fed to the emulsion polymerization zone. Additional advantages are gained by adding water to the effluent from the solution polymerization zone followed by a flashing of a portion of the unpolymerized monomer prior to feeding to the emulsion polymerization zone.

Also, according to my invention, the latex from an emulsion polymerization is extracted with a solvent to remove the polymer, and the resulting solution added to the product solution from a solution polymerization.

According to my invention, at least one of the polymers to be blended is formed in an emulsion system while the other can be formed in an emulsion system or a solution system. Examples of polymers formed by solution polymerization suitable for the practice of my invention include polybutadiene, polyisoprene, polyethylene, polyisobutylene, polystyrene, ethylene-propylene rubber, and block copolymers such as are described in Ser. No. 796,277 filed Mar. 2, 1959. Examples of polymers formed by emulsion polymerization suitable for the practice of my invention include styrene-butadiene rubber, butadiene-vinylpyridine rubber, polyvinylchloride, polystyrene, polyacrylonitrile, polyvinylacetate, and butadiene-acrylonitrile copolymer. Some of the blends which are now known to be useful include blends of high cis content polybutadiene with SBR, polyvinylchloride with polyethylene, and polyacrylonitrile with polybutadiene. Of course, other blends can be made from the above and other polymers.

In the drawing, FIGURE 1 is a diagrammatic sketch of a system in which the latex resulting from an emulsion polymerization is extracted with a solvent and the resulting solution blended with the product solution of a solution polymerization.

Figure 1:
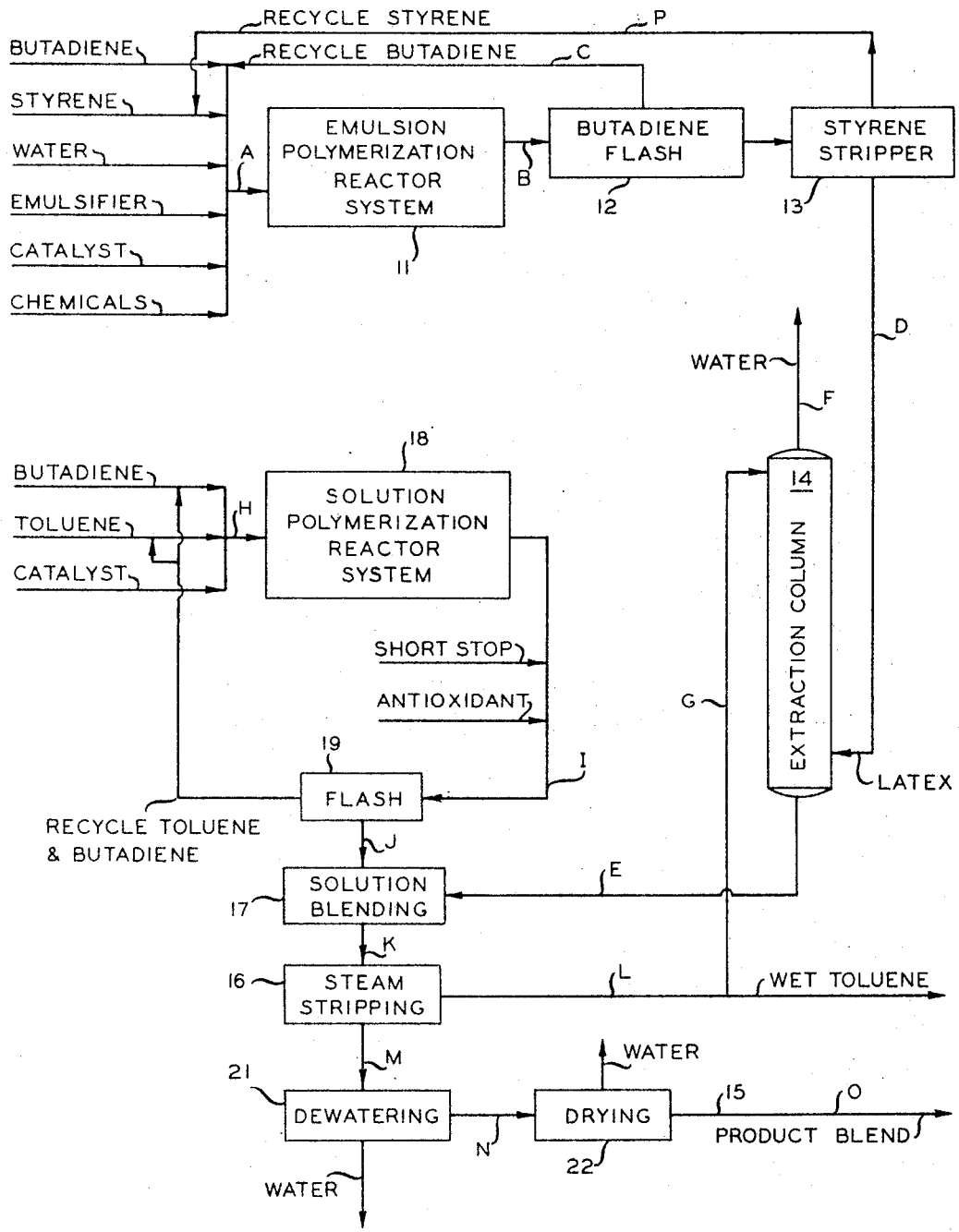

In the system illustrated in FIGURE 1, the various ingredients for an emulsion polymerization reaction are fed into the emulsion polymerization reactor system 11. In the particular system illustrated the monomers comprise butadiene and styrene and the product is styrene-butadiene rubber (SBR). The product from the reactor system is fed to a flash zone 12 wherein unreacted butadiene is removed and recycled. The resulting product then is fed to a styrene stripper 13 from which unreacted styrene is returned to the system and the product fed to extraction column 14. In column 14, the latex is contacted with wet toluene from a steam stripper 16 and the rubber is dissolved and fed into a solution blending zone 17 while water is removed from the top of column 14. Butadiene, toluene and a catalyst are fed into solution polymerization reactor system 18 wherein a high cis content polybutadiene is formed and removed therefrom to flash zone 19. A shortstop for the reaction and an antioxidant are added to the product as shown. The resulting solution of polybutadiene in toluene is fed into solution blending zone 17 where it is blended with the solution of SBR from extraction column 14 and the combined stream fed to steam stripping zone 16 from which toluene is removed. The stream then is fed into a dewatering means 21 which can be, for example, a water expeller, and the relatively dry product further dried in a drying means 22, from which the dry product blend is recovered.

Example I

In an example, according to the illustration of FIGURE 1, butadiene, styrene, water, a catalyst, an emulsifier, and other chemicals are fed into the emulsion polymerization reactor system.

In this example the catalyst comprises ferrous sulfate heptahydrate, sodium formaldehyde sulfoxylate and p-methane hydroperoxide. The emulsifier is a potassium fatty acid soap. The chemicals include a buffer, potassium chloride; a disperser, a sodium salt of naphthalene sulfonic acid condensed with formaldehyde; a sequestering agent, a tetrasodium salt of ethylenediamine tetraacetic acid; and a modifier, tertiary dodecyl mercaptan. In this example, 16 pounds of catalyst and 3 pounds of chemicals are used. Following the reaction a shortstop, a mixture of sodium polysulfide and sodium dimethyl dithiocarbamate, and an antioxidant, a mixture of alkylated aryl phosphites, are added.

In the reactor system a copolymer of the butadiene and styrene, SBR, is formed. Following flashing of excess butadiene, excess unreacted styrene is stripped and the resulting latex fed to extraction column 14. Reactor system 11 is maintained at a temperature of 41° F. and a pressure of 140 p.s.i.a. The butadiene flash is in two stages, the first stage at 90° F. and 20 p.s.i.a. while the second stage is at 90° F. and 180 mm. Hg. Styrene stripper 13 is operated at a pressure of 90 mm. Hg. and a temperature of 130° F. Wet toluene from steam stripping zone 16 is fed to extraction column 14 where it is contacted with the SBR latex at a temperature of 120° F. and a pressure of 20 p.s.i.a. The solution of SBR in toluene is blended in blending means 17 with the solution of the high cis polybutadiene polymer formed in solution polymerization reactor system 18. Butadiene, toluene and a catalyst are fed to zone 18. The catalyst comprises tri-isobutylaluminum, iodine, and titanium tetrachloride in the mol ratio of 11:3:1. The reaction is maintained at a temperature of 55° F. and a pressure of 140 p.s.i.a. The shortstop, rosin acid, and an antioxidant, 2,2'-methylene bis(4-ethyl-6-tertiarybutyl phenol), are fed into the effluent as shown and the product passed to flash system 19. Here butadiene and toluene are removed at a pressure of 18 p.s.i.a. and a temperature of 240° F. and recycled to the reactor system. The remaining solution of high cis content butadiene in toluene is fed to solution blending zone 17 where it is blended with the solution from extraction column 14 at 150° F. The blended solutions are fed to steam stripping zone 16 which is operated in two stages, the first stage at 15 p.s.i.a. and 205° F. and the second stage at 18 p.s.i.a. and 220° F. The polymer blend then is fed to dewatering means 21 which in this example is a water expeller operated at 150° F. from which excess water is removed. The partially dry polymer then is fed to drying means such as an extruder dryer 22 wherein the remainder of the water is removed. The amounts of the various components in the various streams are given in Table I, the amounts being in pounds per 2000 pounds of dry blended polymer.

TABLE I

|  | A[1] | B | C | D | E | F | G | H | I |
|---|---|---|---|---|---|---|---|---|---|
|  | Reactor feed | Reactor effluent | Recycle butadiene | Styrene stripper bottoms | Rubber extract | Water from extractor | Solvent to extractor | Cis-polybutadiene reactor change | Cis-polybutadiene reactor effluent |
| Butadiene | 1,260 | 480 | 460 |  |  |  |  | 1,250 | 250 |
| Styrene | 420 | 200 | 10 |  |  |  |  |  |  |
| Toluene |  |  |  |  | 10,000 | 10 | 10,010 | 11,250 | 11,250 |
| Water | 3,360 | 3,360 |  | 3,700 | 10 | 3,700 | 10 |  |  |
| Catalyst, chemicals | 19 | 19 |  | 19 | 10 | 9 |  | 10 | 32 |
| Emulsifier | 84 | 84 |  | 84 | 42 | 42 |  |  |  |
| Polymer |  | 1,000 |  | 1,000 | 1,000 |  |  |  | 1,000 |
| Total | 5,143 | 5,143 | 470 | 4,803 | 11,062 | 3,761 | 10,020 | 12,510 | 12,532 |

|  | J | K | L | M | N | O | P |
|---|---|---|---|---|---|---|---|
|  | Cis-polybutadiene flash bottoms | Blended polymer solution | Wet toluene | Polymer-water slurry | Partially dewatered rubber | Dry product blend | Styrene stripper overhead |
| Emulsifier |  | 42 |  | 42 | 20 | 20 |  |
| Butadiene | 6 | 6 | 6 |  |  |  | 20 |
| Styrene |  |  |  |  |  |  | 190 |
| Toluene | 6,000 | 16,000 | 15,990 | 10 | 10 |  |  |
| Water |  | 10 |  | 25,000 | 250 | 10 |  |
| Catalyst, chemicals | 32 | 42 |  | 42 | 5 | 5 |  |
| SBR Polymer |  | 1,000 |  | 1,000 | 1,000 | 1,000 |  |
| Cis-4 polymer | 1,000 | 1,000 |  | 1,000 | 1,000 | 1,000 |  |
| Total | 7,038 | 18,100 | 15,996 | 27,094 | 2,285 | 2,035 | 210 |

[1] Letters from FIGURE 1.

Figure 2:
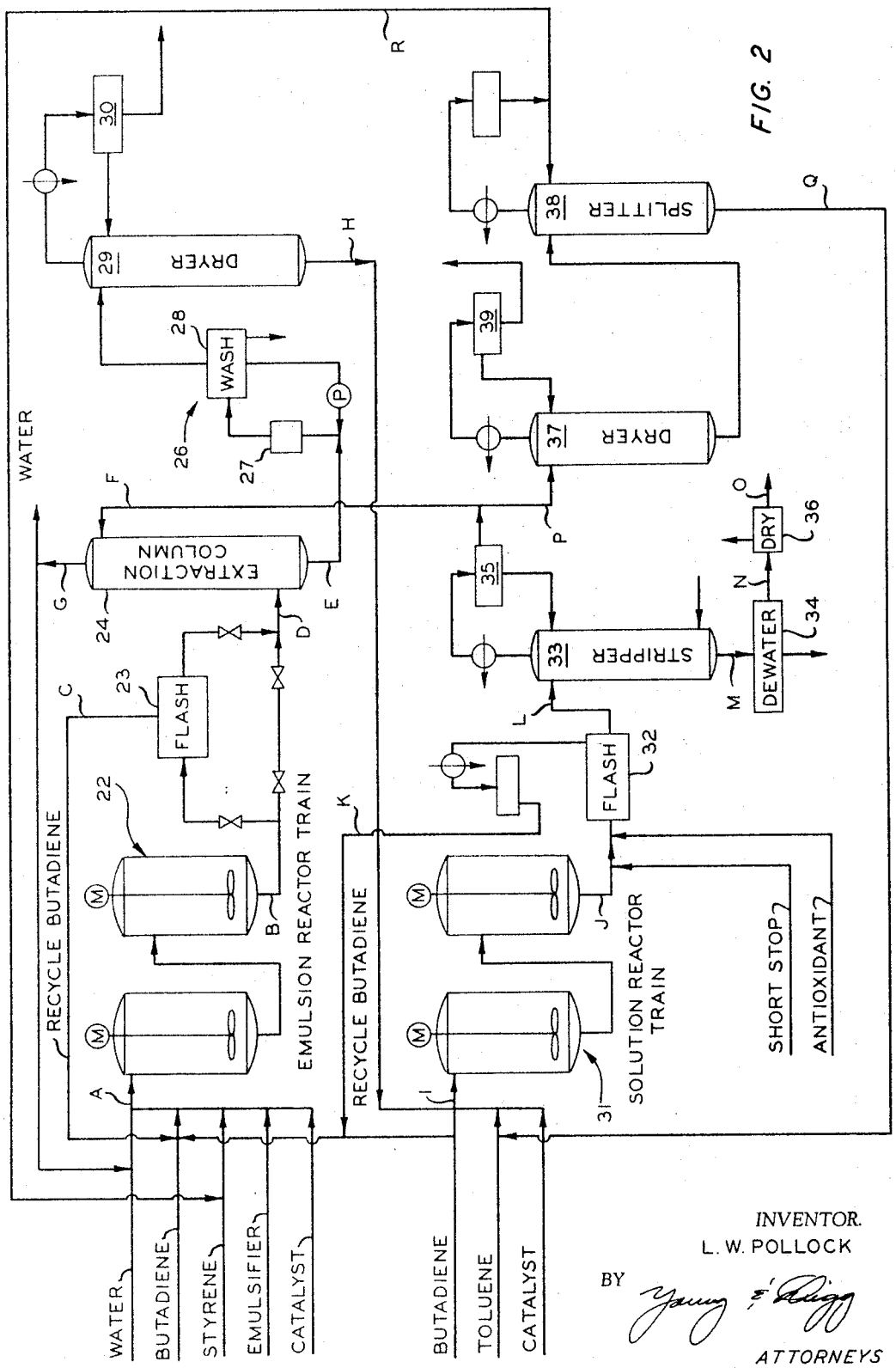
FIGURE 2 is a diagram of a system in which the latex resulting from an emulsion polymerization is extracted with a solvent and the resulting solution added to the feed to a solution polymerization reactor system.

FIGURE 2 illustrates a system in which an extracted emulsion polymer is included with the feed to a solution polymerization system to produce a blended polymer product. In this system an emulsion polymer, produced in emulsion reactor train 22, is passed to flash means 23 or directly to extraction column 24. In this column the polymer is extracted from the latex, the resulting solution being passed after further processing as feed to a subsequent polymerization zone, the water being removed to waste or recycled to reactor train 22. The solution from extraction column 24 is passed through water wash system 26, comprising homogenizer 27 and phase separator 28, to drying column 29. The dried solution from column 29 is introduced into the feed to solution reactor train 31. The effluent from reactor train 31 is passed through a flash system 32 and a stripper 33 to dewatering apparatus 34 and dryer 36. From stripper 33 a portion of the overhead product, comprising solvent and monomer, is passed to extraction column 24, and a portion to the drying column 37 and splitter 38 from which the monomer is recycled to emulsion system 22 while the solvent is recycled to the solution system 31. Phase separators 30, 35, and 39 are provided as shown.

Example II

In an example of the operation according to FIGURE 2, reactor train 22 is maintained at a temperature of 41° F. and a pressure of 140 p.s.i.a. maximum. The feed comprises water, butadiene, styrene, emulsifier, a catalyst and chemicals. The catalyst emulsifier, chemicals, shortstop and antioxidant are the same as that utilized in reactor 11 of FIGURE 1 in Example I. In this example, flash system 23 is by-passed and the entire effluent from system 22 passed into extraction column 24. Here the SBR polymer is extracted by a stream of toluene from stripper 32 while water is removed overhead, the column being maintained at 120° F. and 140 p.s.i.a. The solution is washed and passed to dryer 29 which is at 200° F. and 65 p.s.i.a. The dry stream comprising toluene and SBR, along with some unreacted butadiene and styrene, is passed to reactor system 31 along with butadiene, toluene and a triisobutylaluminum, iodine, titanium tetrachloride catalyst as used in Example I. The polymerization of the butadiene is carried out at 40 to 125° F. and 140 p.s.i.a. The effluent from reactor train 31 is passed through flash zone 32 where some butadiene, styrene and toluene are removed at 240° F. and 18 p.s.i.a. and the remainder being passed to stripper 33. Stripper 33 represents a two-stage stripping operation, the first stage at 15 p.s.i.a. and 205° F. and the second stage at 18 p.s.i.a. and 220° F. The product steam from stripper 33 comprises substantially all of the SBR polymer from reactor 22 and the high cis content butadiene polymer from reactor 31, along with a small amount of chemicals and toluene and a substantial amount of water. The stream is partially dewatered at 150° F. in water expeller 34, the remainder of the water being removed in drying means 36. The various amounts in the several streams are given in Table II, the amounts being in pounds per 2,000 pounds of dry polymer blend produced.

polymer is produced in reactor 41, passed through a flash system 42 and fed into homogenizer 43, which prepares the feed for an emulsion polymerization in reactor 44. The effluent from reactor 44 is passed through a flash system 46, a stripper 47, dewatering means 48 and dryer means 49. The overhead from stripper 47 is returned to homogenizer 43 while the material flashed from flash system 46 is passed through a drying column 51 and returned to the feed to reactor 41. Phase separators 40, 45, and 50 are provided.

Example III

Figure 3:
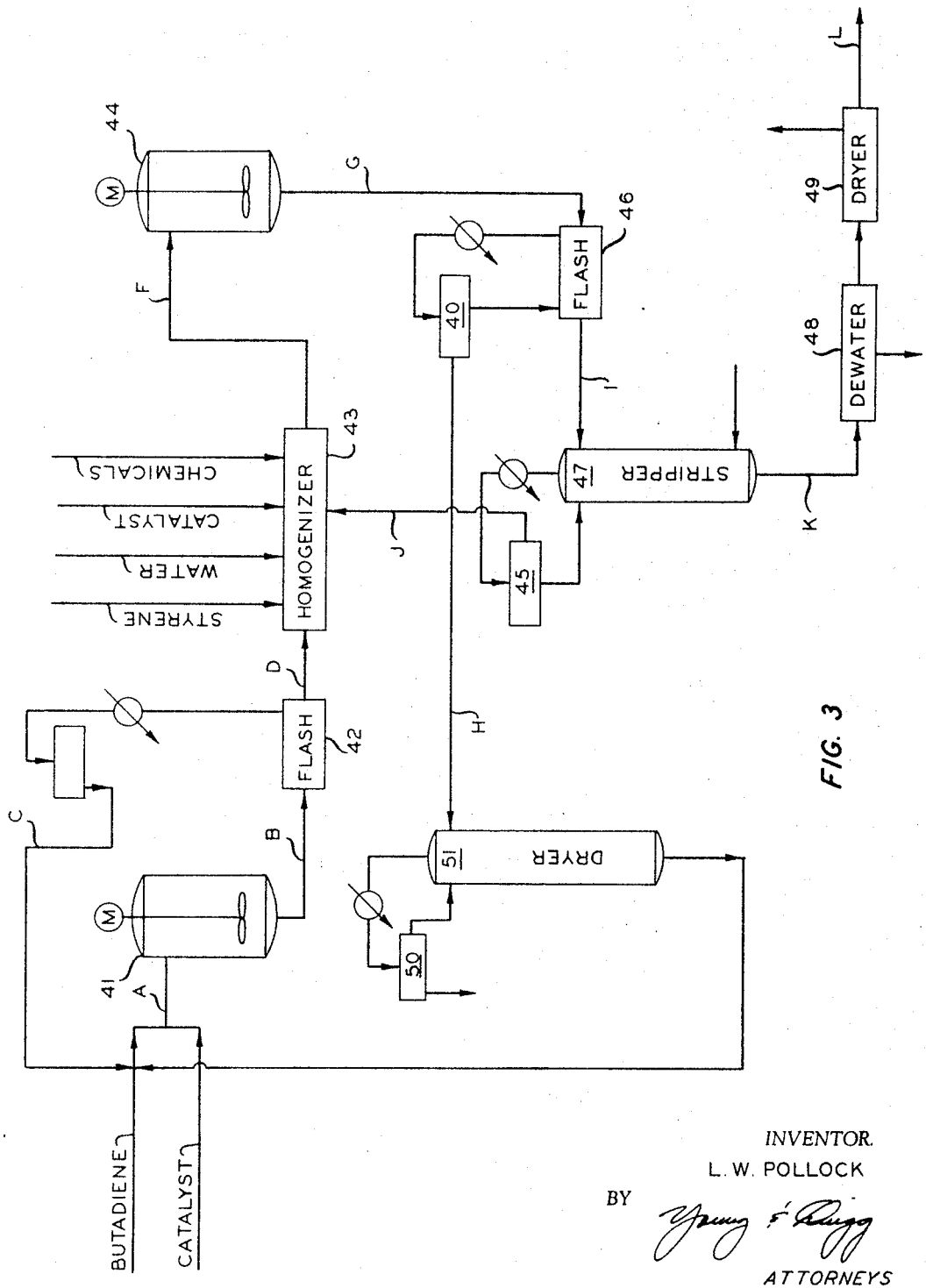
FIGURE 3 is a diagram of a system in which the solution resulting from a solution polymerization is added to the feed to an emulsion polymerization reactor system.

In an example, according to the system of FIGURE 3, butadiene and a catalyst comprising triisobutylaluminum, iodine and titanium tetrachloride as used in Examples I and II above, are fed into reactor 41 which is maintained at a temperature of 55° F. and a pressure of 140 p.s.i.a. The effluent is passed into flash means 42 which is a two-stage flash means, the first stage being at 100° F. and 59 p.s.i.a. while the second stage is at 32° F. and 18 p.s.i.a. The effluent from flash system 42 is passed into homogenizer 43 where it is blended with styrene, water, an emulsifier, a catalyst for the emulsion polymerization reaction, and other chemicals, the catalyst, emulsifier and chemicals being the same as utilized in the emulsion polymerization of Examples I and II. The blended stream of emulsion is produced at a temperature of 40° F. and 100 p.s.i.a. and passed into reactor 44 where the polymerization reaction is carried out at a temperature of 40° F. and 140 p.s.i.a. The effluent from reactor 44 is flashed in zone 46 which is a two-stage flash, the first stage being at 100° F. and 18 p.s.i.a while the second stage is at 100° F. and 180 mm. Hg. The product stream then is passed into stripper 47 and the slurry from stripper 47 passed to dewatering means 48, which in this instance is a water expeller, and to dryer 49. Butadiene removed and flashed from zone 46 is dried and recycled to reactor 41 while

TABLE II

| Basis=2000# Polymer Component | A[1] SBR reactor feed | B SBR reactor effluent | C Recycle SBR butadiene | D Extractor feed | E Extract | F Solvent | G Water phase | H Dried extract | I Cis-4 reactor feed | J Cis-4 reactor effluent |
|---|---|---|---|---|---|---|---|---|---|---|
| Butadiene | 1,260 | 480 |  | 480 | 480 |  |  | 480 | 1,250 | 250 |
| Styrene | 420 | 200 |  | 200 | 1,000 | 800 |  | 1,000 | 1,360 | 1,360 |
| Toluene | 20 | 20 |  | 20 | 10,020 | 10,010 | 10 | 10,020 | 21,250 | 21,250 |
| Water | 3,360 | 3,360 |  | 3,360 | 10 | 10 | 3,360 |  |  |  |
| Catalyst | 16 | 16 |  | 16 |  |  |  |  | 10 | 10 |
| Chemicals[2] | 87 | 87 |  | 87 | 5 |  | 82 | 5 | 5 | 5 |
| SBR polymer |  | 1,000 |  | 1,000 | 1,000 |  |  | 1,000 | 1,000 | 1,000 |
| Cis-4 polymer |  |  |  |  |  |  |  |  |  | 1,000 |
| Total | 5,163 | 5,163 | 0 | 5,163 | 12,515 | 10,820 | 3,452 | 12,505 | 24,875 | 24,875 |

| Basis=2000# Polymer Component | K Recycle cis-4 butadiene | L Flash bottoms | M Stripper bottoms slurry | N Partially dewatered rubber | O Blend product | P Wet solvent | Q Recycle styrene | R Recycle toluene |
|---|---|---|---|---|---|---|---|---|
| Butadiene | 244 | 6 |  |  |  | 6 | 6 |  |
| Styrene | 350 | 1,010 |  |  |  | 210 | 200 | 10 |
| Toluene | 9,000 | 12,250 | 10 | 10 |  | 2,240 | 20 | 2,220 |
| Water |  |  | 25,000 | 250 | 10 | 20 |  |  |
| Catalyst |  |  |  |  |  |  |  |  |
| Chemicals[2] |  | 35 | 35 | 5 | 5 |  |  |  |
| SBR Polymer |  | 1,000 | 1,000 | 1,000 | 1,000 |  |  |  |
| Cis-4 Polymer |  | 1,000 | 1,000 | 1,000 | 1,000 |  |  |  |
| Total | 9,594 | 15,301 | 27,045 | 2,265 | 2,015 | 2,476 | 226 | 2,230 |

[1] Letters from Figure 2.
[2] Includes emulsifiers, shortstop antioxidant, etc.

In the system of FIGURE 3, a solution of a polymer produced in a solution polymerization reaction is combined with the feed to an emulsion polymerization system to produce a blended polymer. In this figure a solution stryene and the remaining amount of butadiene removed in stripper 47 are returned to homogenizer 43. The amounts of the various streams are given in Table III in pounds.

TABLE III

| | A[1] | B | C | D | E | F | G | H | I | J | K | L |
|---|---|---|---|---|---|---|---|---|---|---|---|---|
| | Cis-polybutadiene reactor feed | Cis-polybutadiene reactor effluent | Recycle butadiene | Flash bottoms | Homogenize total feed | Reactor feed SBR | Reactor effluent | Recycle butadiene | Flash bottoms | Recycle styrene | Slurry | Dried product |
| Butadiene | 10,000 | 9,000 | 5,000 | 4,000 | 4,000 | 4,000 | 3,220 | 3,180 | 40 | 40 | | |
| Styrene | | | | | 1,000 | 1,000 | 780 | 100 | 680 | 670 | 10 | |
| Water | | | | | 8,000 | 8,000 | 8,000 | | 8,000 | | 9,000 | 10 |
| Catalyst | 10 | 10 | | 10 | 20 | 20 | 20 | | 20 | | 20 | |
| Chemicals | | | | | 100 | 100 | 100 | | 100 | | 100 | 5 |
| Cis-4 polymer | | 1,000 | | 1,000 | 1,000 | 1,000 | 1,000 | | 1,000 | | 1,000 | 1,000 |
| SBR polymer | | | | | | | 1,000 | | 1,000 | | 1,000 | 1,000 |
| Total | 10,010 | 10,010 | 5,000 | 5,010 | 14,120 | 14,120 | 14,120 | 3,280 | 10,840 | 710 | 11,130 | 2,01 |

[1] Letters from Figure 3.

Figure 4:
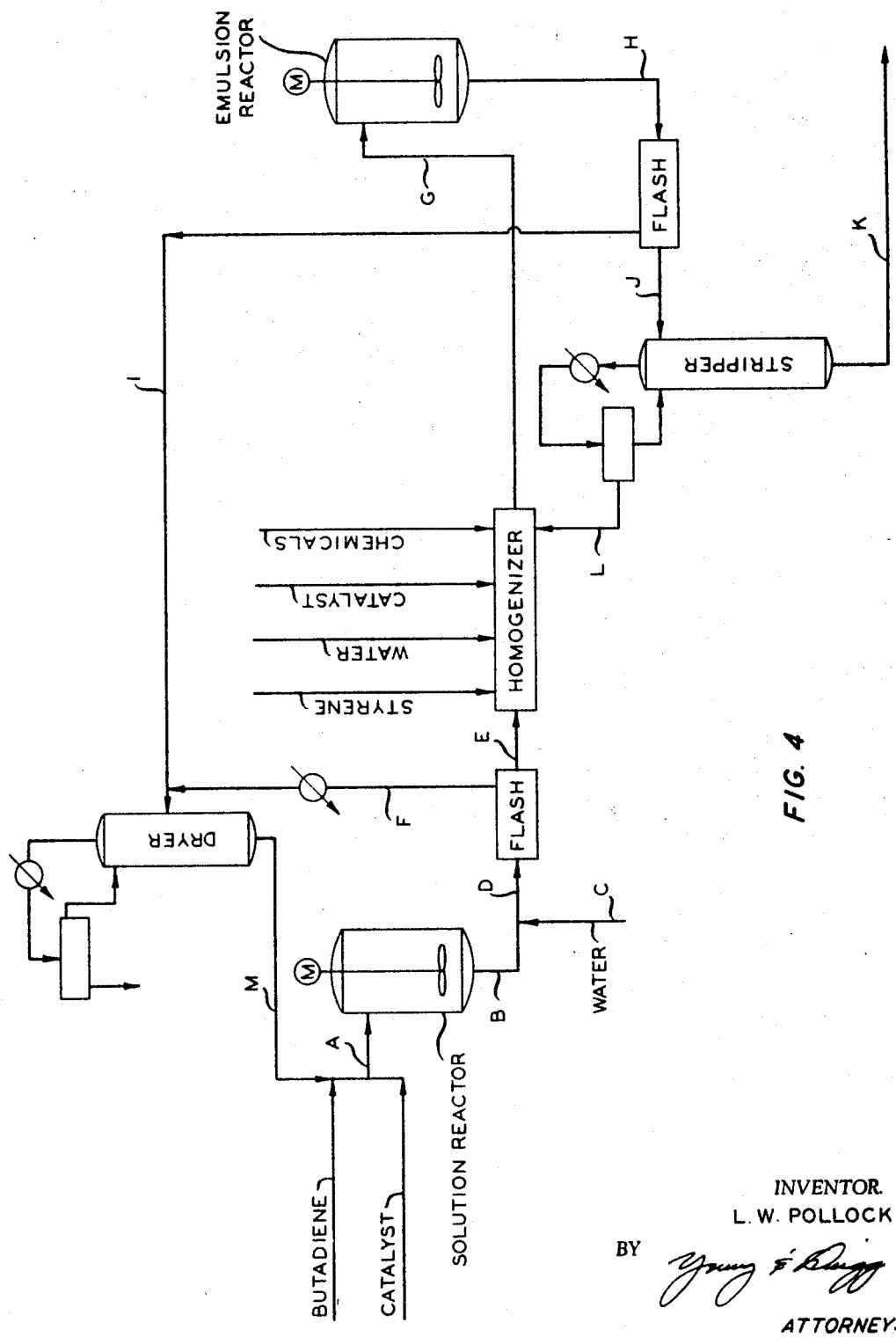
FIGURE 4 is a diagram of another system in which the solution product from a solution polymerization system is added to the feed to an emulsion polymerization system, water being added prior to flashing unreacted monomer.

In the system of FIGURE 4 the polymerization steps are carried out substantially as in the system of FIGURE 3. However, water is added to the effluent from the solution reactor to assist in the flash step, the water then being available as needed in the emulsion polymerization step.

Example IV

In an example, according to FIGURE 4, the solution polymer is high cis content polybutadiene and the polymer produced in the emulsion reactor is SBR, the process being carried out substantially as in Example III, with the difference that water is added prior to the first flash step. The amounts of various materials in the steps of the process are given in Table IV in pounds.

Of course, in all systems, components incompatible with the subsequent polymerization reaction must be removed. Such components are known in the art and it is not necessary at this time to attempt to name all of the many such components which might be harmful to known polymerization reaction. My invention is applicable to the blending of compatible polymers.

Reasonable variation and modification are possible within the scope of my invention which sets forth process for blending emulsion and solution polymers and a process for producing a polymer blend.

I claim:
1. A process for producing a blended polymer composition, which comprises:

TABLE IV

| | A[1] | B | C | D | E | F | G | H | I | J | K | L | M |
|---|---|---|---|---|---|---|---|---|---|---|---|---|---|
| Butadiene | 10,000 | 9,000 | | 9,000 | 300 | 8,700 | 1,300 | 520 | 510 | 10 | | 10 | 9,210 |
| Styrene | 20 | 20 | | 20 | 20 | | 430 | 210 | 20 | 190 | 10 | 180 | 20 |
| Catalyst | 10 | 10 | | 10 | 10 | | 26 | 26 | | | | | |
| Chemicals | | | | | | | | 86 | | 86 | | 112 | 112 |
| Polymer cis-4 | | 1,000 | | 1,000 | 1,000 | | 1,000 | 1,000 | | 1,000 | 1,000 | | |
| Polymer SBR | | | | | | | | 1,000 | | 1,000 | 1,000 | | |
| Water | | | 8,000 | 8,000 | 8,000 | | 8,000 | 8,000 | | 8,000 | 8,000 | | |
| Total | 10,030 | 10,030 | 8,000 | 18,030 | 9,330 | 8,700 | 10,842 | 10,842 | 530 | 10,312 | 10,122 | 190 | 9,230 |

[1] Letters from Figure 4.

Although my invention is applicable to systems in which one or more of the monomers of a polymer which is added to a subsequent polymerization reaction zone is different from the monomer or monomers in subsequent polymerization zone, particular advantages accrue in a system in which all of the monomers of the first polymer are utilized in the second polymerization. For example, when the first polymerized mixture is a polymer of butadiene and the second polymerized material is a polymer or a copolymer of butadiene, complete separation of unreacted monomer from the first reaction need not be made. Examples III and IV illustrate systems in which this is true. The solution reaction is a polymerization of butadiene which is one of the monomers utilized in the emulsion polymerization involving butadiene and styrene.

partially polymerizing a liquid 1-olefin monomer, to produce a first polymer in solution in said monomer;
feeding said liquid monomer containing said first polymer into an emulsion reaction zone wherein said monomer is copolymerized with another monomer in the presence of water to produce a copolymer compatible with said first polymer; and
recovering from the effluent from said reaction zone, a blend comprising said first polymer and said copolymer, wherein the first polymer is a polymer of butadiene and the second polymer is styrene butadiene rubber.

2. A process for producing a blended polymer composition, which comprises:

partially polymerizing a liquid 1-olefin monomer, to produce a first polymer in solution in said monomer;

adding water to the resulting solution of said first polymer in said liquid monomer to produce a mixture of said water and said solution;

flashing excess unreacted monomer from said mixture;

adding to the remaining mixture a second monomer;

feeding said remaining mixture containing said second monomer into a reaction zone wherein said monomer and said second monomer are copolymerized to produce a copolymer compatible with said first polymer; and recovering from the effluent from said reaction zone, a blend comprising said first polymer and said copolymer, wherein the first polymer is a polymer of butadiene and the second polymer is styrene butadiene rubber.

References Cited

UNITED STATES PATENTS

| 3,256,219 | 6/1966 | Will | 260—2.5 |
| 2,683,129 | 7/1954 | Bratton et al. | 200—34.2 |
| 2,918,447 | 12/1959 | Ham | 260—95 |
| 3,004,013 | 10/1961 | Griffin et al. | 260—95 |
| 3,057,840 | 10/1962 | Kircher et al. | 260—95 |
| 3,060,989 | 10/1962 | Pollacd | 260—95 |

FOREIGN PATENTS 586,489 10/1962 Canada.

GEORGE F. LESMES, Primary Examiner

U.S. Cl. X.R.

23—285; 260—29.6, 29.7, 34.2, 95, 876, 878, 879, 881, 884, 896, 887, 888, 889, 890, 894, 897